United States Patent [19]

Ramamurthy

[11] Patent Number: 4,522,776

[45] Date of Patent: Jun. 11, 1985

[54] PROCESS FOR SUBSTANTIALLY ELIMINATING SURFACE MELT FRACTURE WHEN EXTRUDING ETHYLENE POLYMERS

[75] Inventor: Arakalgud V. Ramamurthy, Somerset, N.J.

[73] Assignee: Union Carbide Corporation, Danbury, Conn.

[21] Appl. No.: 508,668

[22] Filed: Jun. 28, 1983

[51] Int. Cl.³ .............................................. B29F 3/04
[52] U.S. Cl. .............................. 264/176 R; 264/564;
425/380; 425/461; 425/467
[58] Field of Search ................... 264/176 R, 169, 564;
425/380, 465–467, 461, 378 R, 379 R, 326.1

[56] References Cited

U.S. PATENT DOCUMENTS

| | | | |
|---|---|---|---|
| 3,125,547 | 3/1964 | Blatz | 525/231 |
| 3,382,535 | 5/1968 | Ferrari | 425/461 |
| 3,879,507 | 4/1975 | Cavanna et al. | 264/51 |
| 3,920,782 | 11/1975 | Cogswell | 264/176 R |
| 4,080,138 | 3/1978 | Hutchinson et al. | 425/467 |
| 4,243,619 | 1/1981 | Fraser et al. | 264/40.6 |
| 4,282,177 | 8/1981 | Kurtz et al. | 264/564 |
| 4,329,314 | 5/1982 | Jackson et al. | 425/326.1 |
| 4,342,848 | 8/1982 | Blanchard et al. | 525/231 |
| 4,348,349 | 9/1982 | Kurtz | 264/564 |
| 4,360,494 | 11/1982 | Kurtz | 425/461 |

FOREIGN PATENT DOCUMENTS 55-21222  2/1980  Japan ................... 425/461

*Primary Examiner*—Jeffery Thurlow
*Attorney, Agent, or Firm*—Clement J. Vicari

[57] ABSTRACT

A process for substantially eliminating surface melt fracture during extrusion of an ethylene polymer wherein the die land has a surface fabricated from a material which increases adhesion between the die land surface and the polymer.

6 Claims, 6 Drawing Figures

PROCESS FOR SUBSTANTIALLY ELIMINATING SURFACE MELT FRACTURE WHEN EXTRUDING ETHYLENE POLYMERS

FIELD OF THE INVENTION

This invention relates to a process for essentially eliminating melt fracture, particularly surface melt fracture, during extrusion of ethylene polymers.

In a more specific aspect the invention relates to a process for substantially eliminating surface melt fracture during extrusion of a molten narrow molecular weight distribution, linear, ethylene copolymer, under conditions of flow rate and melt temperature which would otherwise produce such melt fracture.

BACKGROUND OF THE INVENTION

Most commercial low density polyethylenes are polymerized in heavy walled autoclaves or tubular reactors at pressures as high as 50,000 psi and temperatures up to 300° C. The molecular structure of high pressure low density polyethylene is highly complex. The permutations in the arrangement of its simple building blocks are essentially infinite. High pressure resins are characterized by an intricate long chain branched molecular architecture. These long chain branches have a dramatic effect on the melt rheology of the resins. High pressure low density polyethylene resins also possess a spectrum of short chain branches generally 1 to 6 carbon atoms in length which control resin crystallinity (density). The frequency distribution of these short chain branches is such that, on the average, most chains possess the same average number of branches. The short chain branching distribution characterizing high pressure low density polyethylene can be considered narrow.

Low density polyethylene can exhibit a multitude of properties. It is flexible and has a good balance of mechanical properties such as tensile strength, impact resistance, burst strength, and tear strength. In addition, it retains its strength down to relatively low temperatures. Certain resins do not embrittle at temperatures as low as −70° C. Low density polyethylene has good chemical resistance, and it is relatively inert to acids, alkalis, and inorganic solutions. It is, however, sensitive to hydrocarbons, halogenated hydrocarbons, and to oils and greases. Low density polyethylene has excellent dielectric strength.

More than 50% of all low density polyethylene is processed into film. This film is primarily utilized in packaging applications such as for meat, produce, frozen food, ice bags, boilable pouches, textile and paper products, rack merchandise, industrial liners, shipping sacks, pallet stretch and shrink wrap. Large quantities of wide heavy gauge film are used in construction and agriculture.

Most low density polyethylene film is produced by the tubular blown film extrusion process. Film products made by this process range in size, from tubes which are about two inches or less in diameter, and which are used as sleeves or pouches, to huge bubbles that provide a lay flat of up to about twenty feet in width, and which, when slit along an edge and opened up, will measure up to about forty feet in width.

Polyethylene can also be produced at low to medium pressures by homopolymerizing ethylene or copolymerizing ethylene with various alpha-olefins using heterogeneous catalysts based on transition metal compounds of variable valence. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad.

Linear low density polyethylene can also be produced by high pressure techniques as is known in the prior art.

U.S. Pat. No. 4,302,566 in the names of F. J. Karol et al and entitled Preparation of Ethylene Copolymers in Fluid Bed Reactor discloses that ethylene copolymers, having a density of 0.91 to 0.96, a melt flow ratio of greater than or equal to 22 to less than or equal to 32 and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. Pat. No. 4,302,565 in the names of G. L. Goeke et al and entitled Impregnated Polymerization Catalyst, Process for Preparing, and Use for Ethylene Copolymerization discloses that ethylene copolymers, having a density of 0.91 to 0.96, a melt flow ratio of greater than or equal to 22 to less than or equal to 32 and a relatively low residual catalyst content can be produced in granular form, at relatively high productivities, if the monomer(s) are copolymerized in a gas phase process with a specific high-activity Mg-Ti-containing complex catalyst which is impregnated in a porous inert carrier material.

The polymers as produced, for example, by the processes of said applications using the Mg-Ti containing complex catalyst possess a narrow molecular weight distribution, Mw/Mn, of about greater than or equal to 2.7 or less than or equal to 4.1.

LOW DENSITY POLYETHYLENE: RHEOLOGY

The rheology of polymeric materials depends to a large extent on molecular weight and molecular weight distribution.

In film extrusion two aspects of rheological behavior are important: shear and extension. Within a film extruder and extrusion die, a polymeric melt undergoes severe shearing deformation. As the extrusion screw pumps the melt to, and through, the film die, the melt experiences a wide range of shear rates. Most film extrusion processes are thought to expose the melt to shear at rates in the 100–5000 sec$^{-1}$ range. Polymeric melts are known to exhibit what is commonly termed shear thinning behavior, i.e., non-Newtonian flow behavior. As shear rate is increased, viscosity (the ratio of shear stress, $\tau$, to shear rate, $\lambda$) decreases. The degree of viscosity decrease depends upon the molecular weight, its distribution and molecular configuration, i.e. long chain branching of the polymeric material. Short chain branching has little effect on shear viscosity. In general, high pressure low density polyethylenes have a broad molecular weight distribution and show enhanced shear thinning behavior in the shear rate range common to film extrusion. The narrow molecular weight distribution resins used in the present invention exhibit reduced shear thinning behavior at extrusion grade shear rates. The consequences of these differences are that the narrow distribution resins used in the present invention require higher power and develop higher pressures during extrusion than the high pressure low density polyethylene resins of broad molecular weight distribution and of equivalent average molecular weight.

The rheology of polymeric materials is customarily studied in shear deformation. In simple shear, the velocity gradient of the deforming resin is perpendicular to the flow direction. The mode of deformation is experimentally convenient but does not convey the essential information for understanding material response in film fabrication processes. As one can define a shear viscosity in terms of shear stress and shear rate, i.e.:

$$\eta \text{ shear} = \tau_{12}/\lambda$$

where
$\eta$ shear = shear viscosity (poise)
$\tau_{12}$ = shear stress (dynes/cm$^2$)
$\lambda$ = shear rate (sec$^{-1}$) an extensional viscosity can be defined in terms of normal stress and strain rate, i.e.,:

$$\eta \text{ ext} = \pi/\epsilon$$

$\eta$ ext = extensional viscosity (poise)
$\pi$ = normal stress (dynes/cm$^2$)
$\epsilon$ = strain rate (sec$^{-1}$)

During extrusion of a high molecular weight ethylene polymer and particularly those having a narrow molecular weight distribution through dies, as with other such polymeric materials, "melt fracture" occurs when the extrusion rate exceeds a certain critical value.

"Melt Fracture" is a general term employed by the polymer processing industry to describe a variety of extrudate irregularities during extrusion of molten polymers through dies. The occurrence of melt fracture severely limits the rate at which acceptable products can be fabricated under commercial conditions. The first systematic study of melt fracture was conducted by Nason in 1945 and since then several investigators have studied this in an attempt to understand the underlying mechanism(s) for its occurrence. A critical review of the literature on melt fracture has been presented by C. J. S. Petrie and M. M. Denn (American Institute of Chemical Engineers Journal, Vol. 22, Pages 209–236, 1976) which indicates that the present understanding of the mechanism(s) leading to melt fracture in molten polymers is far from complete.

The melt fracture characteristics of a molten polymer is customarily determined using a conventional capillary rheometer such as the type commercially available from Instron Corporation, Canton, Mass. The experiment consists of charging a barrel with solid polymer, melting the polymer in the barrel by the application of heat, forcing the molten polymer at a given temperature through a capillary die of known dimensions, determining the relationship between flow rate and pressure drop through the capillary die and examining the extrudate surface characteristics at a given flow rate or pressure. Two modes of operation can be used to force the molten polymer through the capillary die: controlled pressure in the barrel by either dead weight loading (melt indexer type) or gas pressure (requiring measurement of flow rate), and controlled volume displacement with a piston in the barrel (requiring measurement of pressure in the barrel).

With the knowledge of the required barrel pressure (P) for a given flow rate (Q), an apparent shear stress and an apparent shear rate is calculated at a given temperature for a given polymer using the expressions given below:

$$\text{Apparent shear stress:} = \frac{D\Delta P}{4L}$$

$$\text{Apparent shear rate:} = \frac{32 Q}{\pi D^3}$$

where:
$\Delta P$ is the pressure drop through the die,
Q is the volumetric flow rate through the die,
D is the diameter of the capillary, and
L is the length of the capillary The apparent values are usually displayed on logarithmic coordinates along with the observed extrudate surface characteristics.

There are several assumptions inherent in the above calculations. These are:
1. The flow in the capillary is steady, laminar and fully developed;
2. There are no friction losses in the barrel;
3. The fluid behavior is Newtonian;
4. The fluid behavior is time-independent;
5. Viscosity is independent of pressure;
6. Isothermal flow;
7. No slip at the wall of the capillary.

Thus, corrections are required to the calculated apparent values of shear stress and shear rate in order to obtain the true values. The procedures for these corrections are amply described in standard monographs on the subject (for example, see van Wazer, J. R. et al., "Viscosity and Flow Measurement" Interscience, 1966). However, a majority of the reports on the viscosity characteristics of molten polymers only consider corrections for departures from fully developed flow and Newtonian behavior. The other assumptions are either ignored or considered negligible in engineering calculations.

The extrudate surface characteristics, in general, show that at low shear stresses the emerging extrudate is smooth and glossy. At a critical value of the stress, the extrudate exhibits loss of surface gloss. The loss of gloss is due to fine scale roughness of the extrudate surface which can be perceived under a microscope at moderate magnification (20–40X). This condition represents the "onset" of surface irregularities and most investigators believe this to occur at a critical linear velocity through the die. At extrusion rates above the critical, two main types of extrudate irregularities can be identified with most polymer melts: surface irregularities and gross irregularities. Surface irregularities (henceforward referred to as surface melt fracture) occur under apparently steady flow conditions over a range of flow rate depending on the molecular characteristics of the polymer. These are characterized by closely spaced circumferential ridges along the extrudate. In a more severe form, it resembles what is generally known as "sharkskin". The surface melt fracture, as the name implies, is confined only to the surface of the extrudate and the core of the extrudate appears to show no irregularity. Surface melt fracture is exhibited to a greater or lesser extent by most thermoplastics including conventional low density polyethylene (HP-LDPE) and polyvinyl chloride (PVC). Surface melt fracture has received relatively little attention in the literature in comparison to the more severe, gross irregularities which occur at high extrusion rates. The available literature on surface melt fracture show the following.

(a) The onset of surface melt fracture is independent of the die dimension (diameter, L/D and taper angle at the entry) and the materials of construction of the die.
(b) The onset of melt fracture is considerably delayed by increasing the temperature of the melt.
(c) Polymers with linear structure (for example, high density polyethylene) show increased tendency to surface melt fracture as compared to those with branched structure.
(d) Polymers with narrow molecular weight distribution show more severe surface melt fracture than those with broad distribution.

There is widespread agreement amongst different investigators that surface melt fracture is due to effects at the die exit where the viscoelastic melt is subjected to high local stresses as it parts company with the die resulting in cyclic build-up and release of surface tensile forces. As a result, differential recovery occurs between the skin and core of the extrudate.

As the extrusion rate is increased further, the emerging extrudates exhibit gross irregularities (hereafter referred to as gross melt fracture) which are no longer confined to the surface of the extrudates. This is a catastrophic defect in the extrudates and has received considerable attention in the literature. The term, "Melt Fracture", coined by Tordella, was originally intended to describe the gross irregularities which occur at high rates of extrusion. In contrast to the surface melt fracture, gross melt fracture occurs under unsteady conditions with spiralling flow instabilities at the die entry and, pressure and flow rate fluctuations prevail. The onset of gross melt fracture occurs at approximately constant shear stress ($10^5$–$10^6$ newtons/sq. meter). Depending on the molecular characteristics of the polymer, the emerging extrudates show a variety of distortions ranging from those which show some periodicity (alternating smooth and rough, wavy, bamboo, screw thread etc.) to random distortions with no regularity. The extensive literature on gross melt fracture indicate the following.

(a) The onset of gross melt fracture occurs at a critical shear stress and is relatively independent of the die length, die diameter and temperature.
(b) The critical stress for gross melt fracture is independent of the molecular weight distribution but the critical shear rate increases with the width of distribution.
(c) Die entry can have a significant effect on the critical shear rate for the onset of gross melt fracture.
(d) The critical shear rate increases with increasing L/D ratio of the die and increasing the melt temperature.

Several mechanisms have been proposed for the occurrence of gross melt fracture and there is no general agreement on either the mechanism or the site of initiation of this defect. Gross melt fracture has been proposed to be due to either die entry or die land effects. The proposed mechanisms include: tearing of melt in the die entry region due to exceeding the melt strength and the propagation of the resulting spiralling instabilities at the entry down the die: inertial effects such as Reynolds type of turbulence; slip-stick in the die land region; and, rheological effects such as pressure induced crystallization and molecular orientation at the entry.

The influence of the materials of construction of the capillary die on the critical stress for gross melt fracture has been examined by Tordella (Journal of Applied Polymer Science, Vol. 7, Pages 215–229, 1963) and by Metzger and Hamilton (Society of Plastics Engineers Transactions, Vol. 4, Pages 107–112, 1964) with high density polyethylene resins. These workers found the critical stress for gross melt fracture to be independent of the materials of construction of the die which included: stainless steel (both polished and very rough); glass; graphite; bronze; sintered bronze; and, teflon.

In conclusion, the available literature indicates that the mechanism for surface melt fracture is entirely different from that for gross melt fracture and that these are initiated at different regions of the die. The surface melt fracture is believed to be a die exit effect whereas the gross melt fracture is either a die land or a die entry effect. The surface melt fracture is generally agreed to be a consequence of high local stresses at the die exit and there is no general agreement on a mechanism for gross melt fracture.

Linear Low Density Polyethylene (LLDPE) resins have essentially a linear molecular structure with a very narrow molecular weight distribution MWD) in contrast to the conventional high pressure low density polyethylene (HP-LDPE) resins which have long chain branched structure and a much broader MWD. In film applications, products fabricated from LLDPE resins significantly outperform those from HP-LDPE resins because of the differences in molecular architecture. However, extrusion processing of LLDPE with conventional film dies, optimized for HP-LDPE, is limited by the occurrence of severe "melt fracture" at current commercial rates.

The flow behavior of LLDPE resins is qualitatively similar to that of many linear narrow MWD polymers (see FIG. 5). FIG. 5 shows typical data obtained using conventional capillary rheometer for a film grade LLDPE resin along with the observed extrudate surface characteristics. The resin was extruded at a temperature of 220° C. through a capillary die fabricated from carbon steel, with an orifice diameter of 0.040 inch and a length of 0.8 inch (L/D=20). The capillary rheometer was operated under a controlled volume displacement mode. FIG. 5 gives the apparent shear stress—apparent shear rate relationship or the flow curve as calculated using standard procedure.

FIG. 5 also illustrates the key characteristics of LLDPE resins. Below a shear stress (apparent values are implied unless otherwise noted) of approximately 18–20 psi, the flow curve has a constant slope of 0.66 and the emerging extrudates are smooth and glossy. At a shear stress of approximately 20 psi (shear rate: approximately 70 1/sec), the extrudate exhibits loss of surface gloss which under a microscope is seen as due to fine scale roughness of the surface. This represents the onset of surface melt fracture. Note, however, that around the condition for the onset of surface melt fracture, the flow curve exhibits a discrete discontinuity in the form of a change in slope. In the shear stress range of approximately 20–65 psi, the flow curve has a slope of approximately 0.46 and the extrudates exhibit increasingly severe surface melt fracture which ultimately resemble severe "sharkskin" surface. In this range, the flow is steady with no apparent fluctuations in either the measured pressure or the flow rate. At a shear stress of approximately 60–65 psi, the flow becomes unsteady when both the pressure and the flow rate fluctuate between two extremes and the emerging extrudates correspondingly exhibit relatively smooth and rough surfaces. This represents the conditions for the onset of gross melt fracture for the resin. It must be noted here that the constant shear stress of approximately 65 psi, indicated in FIG. 5, is based on an average value for the fluctuating pressure at a given piston speed for illustration purposes only and should not be interpreted as a measured constant value. Because of the unsteady nature of the flow through the capillary, the entire procedure for determining the flow curve becomes invalid. The data presented in FIG. 5 indicates, however, that the flow curve exhibits a second discontinuity at the onset of gross melt fracture. With further increase in the shear stress the extrudates become totally distorted and show no regularity.

The above observations have been found to be generally valid with other LLDPE resins. In particular, the onset of surface melt fracture has been found to occur at a reasonably constant value of the shear stress rather than at a constant linear velocity through the die as reported in the literature. The actual value of the critical stress may, however, vary slightly depending on the molecular weight distribution (MWD) and the comonomer(s) employed. Further, the first discontinuity in the flow curve is reproducible and has been found to reasonably represent the conditions for the onset of surface melt fracture. For a given resin, the critical stress appears to be relatively independent of: (a) melt temperature; (b) die orifice diameter; (c) die L/D ratio; and (d) taper angle at the entry. Surface melt fracture occurs over a wide range of shear stress with LLDPE resins. Under commercial film fabrication conditions with conventional dies, predominantly surface melt fracture is encountered with LLDPE resins.

Any mechanism for surface melt fracture with LLDPE resins must satisfactorily explain the existence of the first discontinuity. The mechanism based on die exit effects, proposed in the literature for the onset of surface melt fracture, does not satisfactorily account for the first discontinuity in the flow curve for linear, narrow MWD polymers such as LLDPE resins.

In seeking an explanation for the existence of the first discontinuity in the flow curve and, perhaps, an alternative mechanism for the onset of surface melt fracture, it is necessary to review the basis on which the flow curve is normally determined. One of the key assumptions, inherent in the analysis of capillary measurements, is the condition of no slip at the die wall. So far, investigators dealing with high viscosity, linear, narrow MWD polymers have failed to recognize the importance of this assumption, particularly during the occurrence of surface melt fracture at apparently steady flow conditions. Measurements can be made with a capillary rheometer and procedures are available to determine the validity of this assumption. (See for example, F. N. Cogswell, "Polymer Melt Rheology—A Guide to Industrial Practice", Halstead Press, 1981, Page 136). This involves standard measurements at a given temperature with a series of capillary dies of constant L/D but different capillary diameters and a plot of apparent shear rate as a function of the reciprocal of the capillary radius (1/R) with apparent shear stress as a parameter. In the absence of slip at the wall, the apparent shear rate will be independent of the capillary radius. In the presence of slip, however, the apparent shear rate at a given shear stress will be a linear function of 1/R with the slope equivalent to four times the slip velocity.

The data obtained for the film grade LLDPE resin at a temperature of 220° C. with a series of capillary dies (diameters in the range 0.020–0.081 inch) of the constant L/D (20) is shown in FIG. 6. It shows that below a shear stress of 20 psi, the measured apparent shear rate is indeed independent of capillary radius indicating a no slip condition. However, at a stress of 20 psi, which is around the critical stress for the onset of surface melt fracture, the measured apparent shear rate is a linear function of 1/R with a slip velocity of 0.05 in/sec. At higher stresses, the slip velocity increases and the extrudates exhibit increasing severity of surface roughness. Thus these measurements clearly demonstrate that the initiation of slip around the critical stress is primarily responsible for the first discontinuity in the flow curve. The increasing slip velocity reduces the pressure required at higher flow rates and consequently the measured flow curve shows more shear thinning behavior beyond the critical stress.

The above measurements establish, for the first time ever, that slip of the molten polymer at the Wall in the die land region and the onset of surface melt fracture occur simultaneously around the same critical shear stress. This is no mere coincidence. Instead, it suggests a mechanism for the onset of surface melt fracture which satisfactorily accounts for the existence of the first discontinuity in the flow curve.

Contrary to the commonly accepted mechanism involving the die exit effects, surface melt fracture occurs as a consequence of the initiation of slip in the die land region. Slippage of the flowing polymer is due to a breakdown of adhesion at the interface under flowing conditions and occurs at a critical stress. Adhesion is a surface phenomenon and is strongly dependent on the nature of surfaces and the intimacy of contact of surfaces involved. Poor adhesion with conventional materials of construction for the die land surfaces is primarily responsible for the initiation of slip and the resulting surface melt fracture. Surface melt fracture can be virtually eliminated under commercial fabrication conditions by proper choice of the materials for the die land surfaces which show improved adhesion to the flowing polymer.

It has been found that standard capillary rheometer studies, with capillaries of different materials of construction, are not appropriate for determining the suitability of a metal for use in the die land regions of commercial dies. The surface melt fracture behavior of a polymer in a capillary die of a given metal may be entirely different from that, for example, in a blown film die with die land surfaces of the same metal. Under film fabrication conditions, some metal surfaces for the die land region have been found to exhibit a transient condition with a so called "induction" period during which the intimacy of contact between the flowing polymer and the metal surface is established thus promoting adhesion at the interface with virtual elimination of surface melt fracture. Capillary dies of the same metals, on the other hand, show little or no influence of the materials of construction on the surface melt fracture behavior. Thus, the relevance of capillary measurements, particularly for determining the influence of materials of construction on surface melt fracture of molten polymers under commercial fabrication conditions, is open to serious question. Previous investigators who have reported the invariance of materials of construction on the melt fracture behavior of linear polymers such as high density polyethylene resins have failed to recognize this aspect. The suitability of a given metal surface for the die land region must, therefore, be determined under the actual conditions of fabrication rather than with a capillary rheometer.

There are several methods for eliminating surface melt fracture under commercial film fabrication conditions. These are aimed at reducing the shear stresses in the die and include: increasing the melt temperature; modifying the die geometry; and use of slip additives in the resin to reduce friction at the wall. Increasing the melt temperature is not commercially useful since it lowers the rate for film formation due to bubble instabilities and heat transfer limitations. Another method for eliminating sharkskin is described in U.S. Pat. No. 3,920,782. In this method, surface melt fracture formed during extrusion of polymeric materials is controlled or eliminated by cooling an outer layer of the material, so it emerges from the die with a reduced temperature while maintaining the bulk of the melt at the optimum working temperature. However, this method is difficult to employ and control.

The invention of U.S. Pat. No. 3,920,782 is apparently based on the inventor's conclusions that the onset of surface melt fracture under his operating conditions with his resins is a function, basically, of exceeding a critical linear velocity with his resins through his dies at his operating temperatures. In the process of the present invention, however, the onset of surface melt fracture in the present applicant's resins under his operating conditions is a function, primarily of exceeding a critical shear stress.

U.S. Pat. No. 3,382,535 discloses a means for designing dies which are to be used for the high speed extrusion coating of wire and cable with plastic materials such as polypropylene, high density and low density polyethylene together with their copolymers, which are responsive, or sensitive, to the taper angles of the extrusion die. The dies of this patent are designed to avoid gross melt fracture of the extruded plastic wire coating which is encountered at significantly higher stresses than that for surface melt fracture encountered during film formation.

The invention of U.S. Pat. No. 3,382,535 resides in the designing of the taper angle of the die entry so as to provide a curvilinear die configuration (FIGS. 6 and 7 of the patent) which converges in the direction of flow of the resin. This procedure however, of, in effect, decreasing the taper angle of the die, will result in an increase in the critical shear rate of the resin processed through the die. This reduces gross distortions as a function only of the angle of entry in and/or to the die. Surface melt fracture is insensitive to taper angles at the die entry and the present invention relates to reducing surface melt fracture as a function of the materials of construction of the die land region including the die exit whereby significantly higher shear rates can be obtained without encountering surface melt fracture during film fabrication.

U.S. Pat. No. 3,879,507 discloses a means of reducing melt fracture during the extrusion of foamable composition into film or sheet. This method involves increasing the length of the die land and/or slightly tapering the die gap, while retaining or decreasing the die gap, which is apparently to be relatively narrow, as compared to the prior art (see column 4, lines 2–6) and of the order of 0.025 inches or 25 mils (column 5, line 10). This kind of melt fracture is produced by premature bubble formation at the surface. This melt fracture, however, is totally different than the melt fracture experienced in processing LLDPE resins for film formation. In other words, the melt fracture is not as a result of rheological properties as discussed herein. Die modifications are designed to reduce the shear stress in the die land region to be below the critical stress level (approximately 20 psi) by either enlarging the die gap (U.S. Pat. Nos. 4,243,619 and 4,282,177) or heating the die lip to temperatures significantly above the melt temperature. Enlarging the die gap results in thick extrudates which must be drawn down and cooled in the film blowing process. While LLDPE resins have excellent drawdown characteristics, thick extrudates increase the molecular orientation in the machine direction and results in directional imbalance and reduction in critical film properties such as tear resistance. Also, thick extrudates limit the efficiency of conventional bubble cooling systems which result in reduced rates for stable operation. The wide gap technology has other disadvantages. The required gap is a function of extrusion rate, resin melt index and melt temperature. The wide gap configuration is not suitable for processing conventional Low Density polyethylene (HP-LDPE) resins. Thus, die gap changes are reguired to accommodate the flexibility expected by the fabricator with a given line.

The heated lip concept is aimed at reducing stresses at the die exit and involves extensive modifications requiring efficient insulation of the hot lips from the rest of the die and from the air ring.

U.S. Pat. No. 3,125,547 discloses a polyolefin composition involving the addition of a fluorocarbon polymer to provide improved extrusion characteristics and melt fracture free extrudates at high extrusion speeds. This is based on the inventor's conclusion that the slip-stick phenomenon at high extrusion speeds and the resulting herring bone pattern on the extrudate surface are due to poor lubrication at the die orifice. The use of the fluorocarbon polymer is intended to promote lubrication and reduce the stresses involved to obtain melt fracture free extrudates. The present invention, however, is based on an exactly opposite reasoning in that, it is the lack of adhesion, rather than lack of lubrication, at the polymer/metal interface in the die land region as the cause of both surface and gross melt fracture in LLDPE resins. The present invention, thus aims at improving the adhesion at the interface by proper choice of the material of construction of the die land region, including the die exit, to achieve melt fracture free extrudates. The practice of U.S. Pat. No. 3,125,547 drastically reduces the stresses with dies constructed from conventional materials which, apparently suggests a modification of the rheological properties of the polyolefin resin due to the presence of the fluorocarbon polymer. The process of the present invention, involving a different material of construction for the die land region, achieves melt fracture free extrudates without significantly affecting the stresses involved or the rheological properties of the resin.

U.S. Pat. No. 4,342,848 discloses the use of Polyvinyloctadecyl Ether as a processing modifier to obtain smoother surface of the extrudates and improved film properties with high density polyetheylene resins. This additive, however, was found to be unsuitable for melt fracture reductions with LLDPE resins.

Additives for use as processing aids to obtain melt fracture reduction in extrudates, are expensive and the added cost, depending on the required concentration, may be prohibitive in resins, such as granular LLDPE, intended for commodity applications. Additives influence the rheological properties of the base resin and, in excess amounts, may adversely affect critical film properties including gloss, transparency, blocking and heat sealability characteristics of the product.

In the process of the present invention, surface melt fracture, can be substantially eliminated by changes in the die i.e., by providing a die land surface fabricated from a material which provides increased adhesion between the die land surface and the polymer. The utility of the present invention arises as a result of the discovery that the primary mechanism for the onset of surface melt fracture in LLDPE resins is the initiation of slip of polymer melt at the die wall. Slip is due to the breakdown of adhesion at the polymer/metal interface under flowing conditions and occurs at a critical shear stress. Adhesion is a surface phenomenon being strongly dependent on the nature of surfaces and the intimacy of contact of surfaces. Thus, techniques to provide good adhesion at the floWing polymer/die wall interface will result in the elimination of surface melt fracture for LLDPE resins. Improvements in adhesion can be achieved by proper choice of materials of construction of the die for a given resin.

In the case where only one surface of the opposing die land surfaces is constructed from the material providing improved adhesion, then surface melt fracture is reduced or eliminated on the surface of the polymer adjacent to the surface showing improved adhesion. If both surfaces of the opposing die land are constructed from the material having improved adhesion, then both surfaces of the polymer would have reduced melt fracture.

Films suitable for packaging applications must possess a balance of key properties for broad end-use utility and wide commercial acceptance. These properties include film optical quality, for example, haze, gloss, and see-through characteristics. Mechanical strength properties such as puncture resistance tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability and flex resistance. Low density polyethylene has a wide range of utility such as in food packaging and non-food packaging applications. Bags commonly produced from low density polyethylene include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention, preferably the ethylene hydrocarbon copolymers, offer an improved combination of end-use properties and are especially suited for many of the applications already served by high pressure low density polyethylene.

An improvement in any one of the properties of a film such as elimination or reduction of surface melt fracture or an improvement in the extrusion characteristics of the resin or an improvement in the film extrusion process itself is of the utmost importance regarding the acceptance of the film as a substitute for high pressure low density polyethylene in many end use applications.

DRAWINGS

SUMMARY OF THE INVENTION

According to the present invention there is disclosed a process for substantially eliminating surface melt fracture during extrusion of an ethylene polymer under adhesion conditions between the material constituting the die land surface and the polymer, which would otherwise produce higher levels of melt fracture which comprises extruding said polymer through a die having a die land surface fabricated from a material other than a conventional die land material which increases adhesion between the die land surface and the polymer, to an extent sufficient to substantially eliminate surface melt fracture.

Preferably both opposing surfaces contain the material providing improved adhesion adjacent the polymer.

"Conventional die land surface or material" as used herein shall mean a die land or die land surface which is fabricated from nickel or chrome plated steel.

DESCRIPTION OF THE PREFERRED EMBODIMENT

DIES

Advantageously, the molten ethylene polymer can be extruded through a die such as a spiral annular die, slit die, etc., preferably an annular die, having a narrow die gap greater than about 5 mils and preferably 5–40 mils. Advantageously, when processing LLDPE resins, it is no longer required to extrude the molten ethylene polymer through a die having a die gap of greater than about 50 mils to less than about 120 mils, as described in U.S. Pat. No. 4,243,619. Conventionally, die land region construction has been largely based on nickel or chrome plated steel surfaces.

Figure 1:
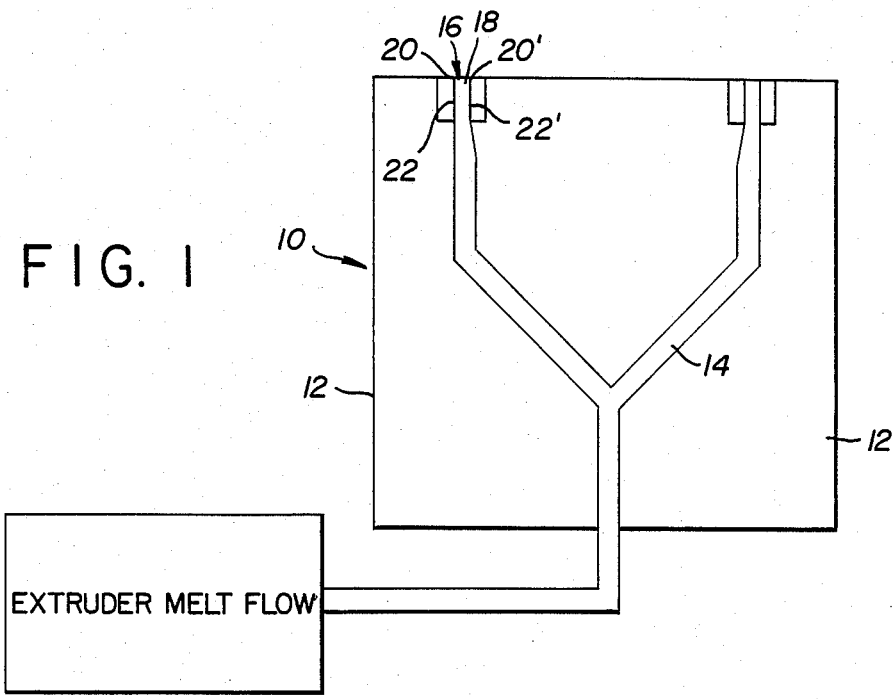
FIG. 1 shows a cross section of a spiral/spider annulus die.

FIG. 1 is a cross-sectional view of a spiral/spider annular die 10 through which the molten thermoplastic ethylene polymer is extruded to form a single layer film, tube or pipe. Die block 12 contains channels 14 for directing the polymer to the die exit. As the molten thermoplastic ethylene polymer is extruded, it spreads out as it passes into the die channels 14.

Figure 2:
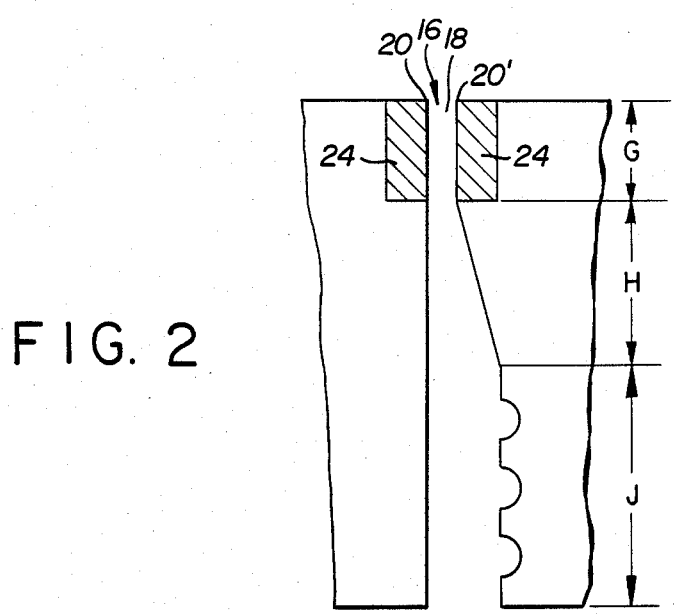
FIG. 2 shows an enlarged cross section of a portion of a spiral die.

Referring to FIG. 2, which is a cross-section of a spiral die, there is indicated a spiral section J, land entry section H and die land G. With reference to FIGS. 1 and 2, at the exit of the die, there is a die discharge outlet identified generally by reference numeral 16. The discharge outlet defines an exit die gap 18 which is formed by opposing surfaces of die lips 20 and 20' extending from opposing die land surfaces 22 and 22'.

Figure 3:
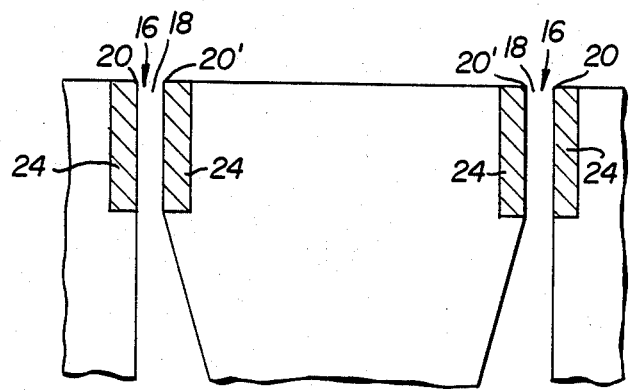
FIG. 3 shows a configuration of the die land region wherein the opposing surfaces which provide increased adhesion in the form of inserts.
Figure 4:
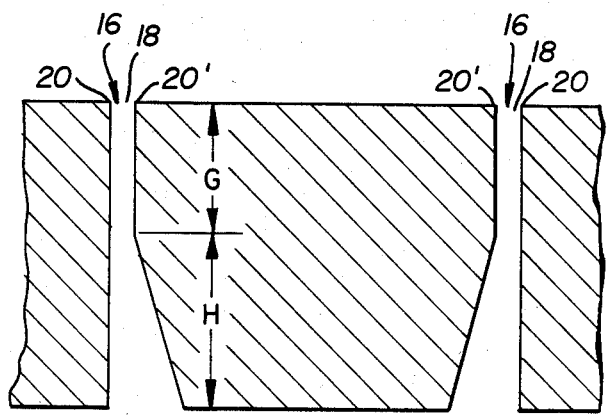
FIG. 4 shows a configuration of the die land region wherein the opposing surfaces with increased adhesion are provided by solid construction of the collar and pin.
Figure 5:
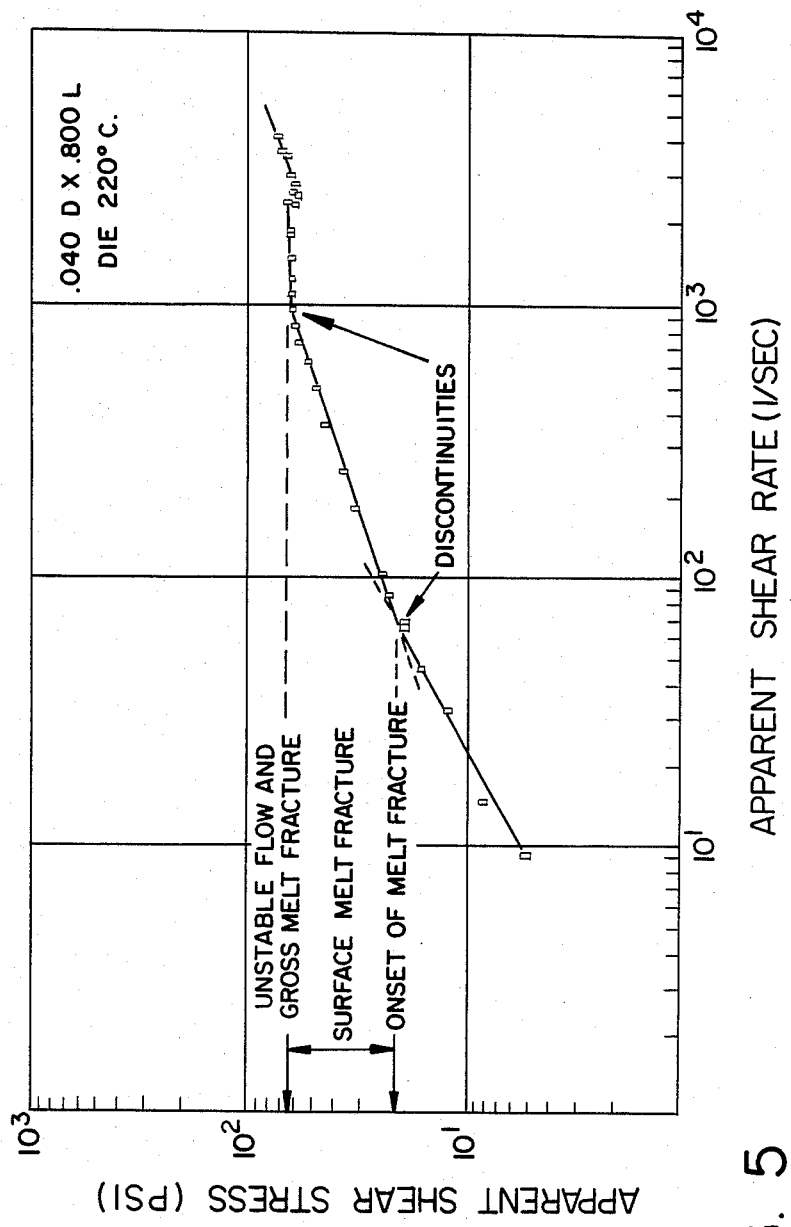
FIG. 5 is a graph showing the flow behavior of a film grade LLDPE.
Figure 6:
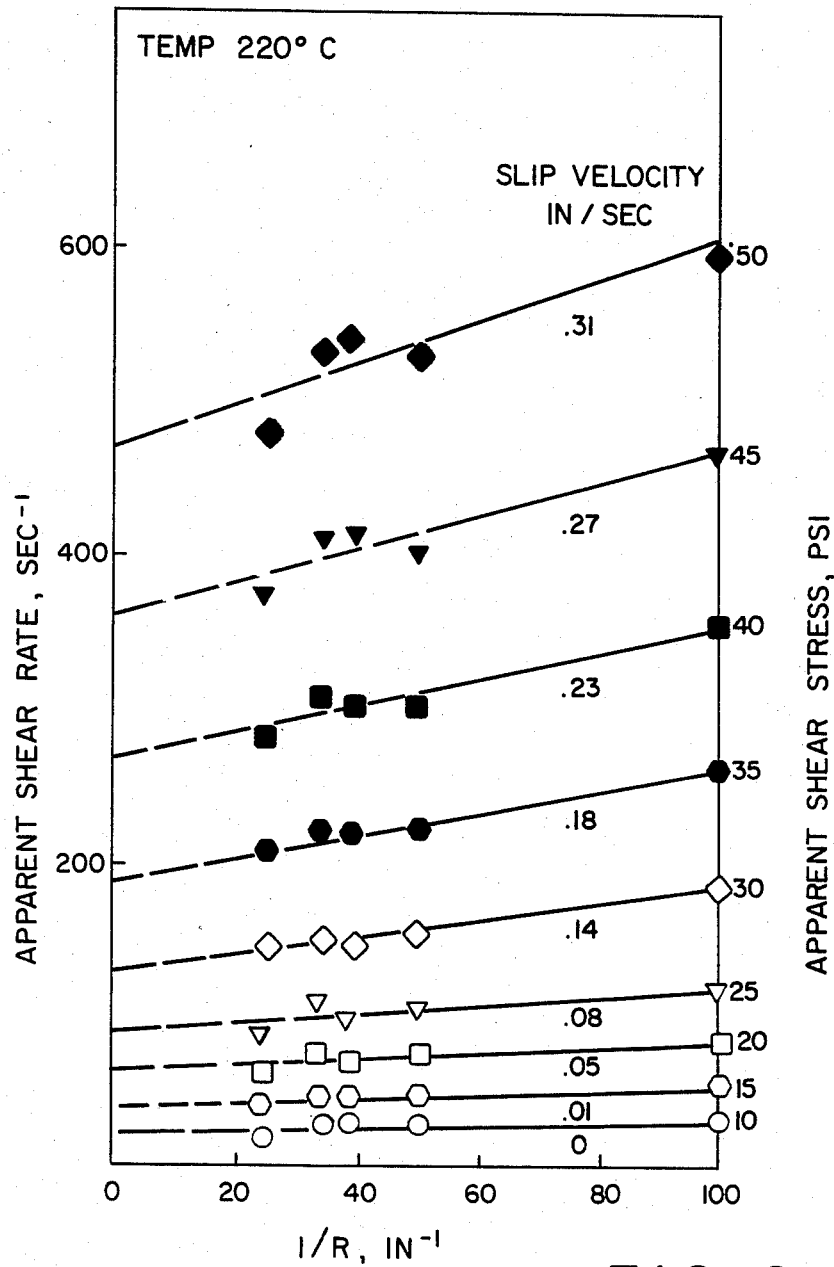
FIG. 6 is a graph showing the slip characteristics of a film grade LLDPE resin.

As shown in FIGS. 3 and 4, the die land region shows a configuration wherein opposing surfaces are fabricated from a material with increased adhesion such as metal or a metal alloy with the improved adhesion characteristics as contrasted to conventional nickel or chrome plated steel. The surfaces can be provided by brass inserts 24 which are secured, preferably detachably secured to the pin and the collar. The inserts can be detachably secured to the modified pin and collar by any suitable means such as by provision of threaded elements disposed interiorly of the inserts which threadably engage in a mating relationship threaded elements of the corresponding surface of the pin or collar. The length measured in the direction of extrudate flow, of the inserts are preferably the length of the die land region although shorter lengths are operable. Other techniques for providing the required die land surface with improved adhesion can be utilized such as by coating the surfaces of the die land region with the material or alternatively by fabricating either the die land section or the entire pin and collar from the material as shown in FIG. 4.

The melt fracture is reduced on the surface of the polymer adjacent to the surface of the material providing improved adhesion. As a result, the process can be practiced with the invention disclosed in U.S. Pat. No. 4,348,349 issued on Sept. 7, 1982. Advantageously, therefore, melt fracture can be reduced on both sides of a film by directing the molten polymer through the die land region wherein only the surface of film in which melt fracture is to be reduced or eliminated is adjacent to the surface having the improved adhesion and on the other surface melt fracture would also be eliminated as disclosed in the patent. Also, according to the present invention, processing of multi-layer films is also possible wherein one layer is formed of LLDPE and another layer is formed from a resin which under the conditions of operation is not subject to melt fracture. Thus, by the process of the instant invention, the LLDPE resin can be passed through the die in contact with the improved adhesion surface whereas the resin not subject to melt fracture is extruded in contact with the other die land surface thereby producing a multi-layer film, both outer surfaces of which would be free of melt fracture.

As mentioned previously, the surface of the die land region adjacent to the molten polymer is constructed from a material providing improved adhesion.

For example, with brass surfaces for the die land region surface melt fracture appears initially during startup which it is believed is due to the presence of adsorbed oxide film. Following a brief induction period, which depends on the rate of extrusion, the extrudate becomes free of surface melt fracture and remains so for an interval depending on the extrusion rate. Surface melt fracture reappears after this interval. This is believed to be due to the degradation of the brass surface as a result of dezincification of brass, at temperatures employed for processing LLDPE resins, thus affecting the adhesion characteristics at the polymer/brass interface. It has been found that the use of a suitable stabilizing additive in the resin eliminates this time dependency with brass surfaces. Thus, for prolonged operation it is preferred that a suitable stabilizing additive be used which can be included in the masterbatch added to the copolymer. A suitable stabilizing additive for use with brass is fatty diethoxylated tertiary amine, commercially available as Kemamine AS 990 from Witco Chemical Corporation, Memphis, Tenn. Other conventional stabilizing additives can also be utilized. Addition of 50–1500 ppm, but preferably in the range of 300–800 ppm, of the tertiary amine is effective in eliminating the recurrence of melt fracture with brass. This stabilizer can be included in the Masterbatches conventionally used for providing required antiblock and slip characteristics for the product.

Film Extrusion

I. Blown Film Extrusion

The films formed as disclosed herein may be extruded by tubular blown film extrusion process. In this process a narrow molecular weight distribution polymer is melt extruded through an extruder. This extruder may have an extrusion screw therein with a length to diameter ratio of between 15:1 to 21:1, as described in U.S. Pat. No. 4,343,755 in the names of John C. Miller et al and entitled "A Process For Extruding Ethylene Polymers". This application describes that this extrusion screw contains a feed, transition and metering section. Optionally, the extrusion screw can contain a mixing section such as that described in U.S Pat. Nos. 3,486,192; 3,730,492 and 3,756,574, which are incorporated herein by reference. Preferably, the mixing section is placed at the screw tip.

The extruder which may be used herein may have a 18:1 to 32:1 length to internal diameter barrel ratio. The extrusion screw used in the present invention may have a length to diameter ratio of 15:1 to 32:1. When, for example, an extrusion screw of a length to diameter ratio of 18:1 is used in a 24:1 extruder, the remaining space in the extrusion barrel can be partially filled with various types of plugs, torpedoes or static mixers to reduce residence time of the polymer melt.

The extrusion screw can also be of the type described in U.S. Pat. No. 4,329,313. The molten polymer is then extruded through a die, as will hereinafter be described.

The polymer is extruded at a temperature of about 163° C. to about 260° C. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference of the die annulus, is in the range 1:1 to 6:1 and preferably, 1:1 to 4:1. The tubular extrudate is cooled by conventional techniques such as, by air cooling, water quench or mandrel.

The drawdown characteristics of the polymers disclosed herein are excellent. Drawdown, defined as the ratio of the dip gap to the product of film gauge and blow up ratio, is kept less than about 250. Very thin gauge films can be produced at high drawdown from these polymers even when said polymer is highly contaminated with foreign particles and/or gel. Thin gauge films of about 0.5 to 3.0 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamental perspective.

As the polymer exits the annular die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Film Extrusion

The films formed as disclosed herein may also be extruded by slot cast film extrusion. This film extrusion method is well known in the art and comprises extruding a sheet of molten polymer through a slot die and then quenching the extrudate using, for example, a chilled casting roll or water bath. The die will hereinafter be described. In the chill roll process, film may be extruded horizontally and laid on top of the chill roll or it may be extruded downward and drawn under the chill roll. Extrudate cooling rates in the slot cast process are very high. Chill roll or water bath quenching is so fast that as the extrudate cools below its melting point, crystallites nucleate very rapidly, supramolecular structures have little time to grow and spherulites are held to a very small size. The optical properties of slot cast film are vastly improved over those characterizing films using the slower cooling rate tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rates than practiced in the blown film process. The higher temperatures reduce shear stresses in the die and raise the output threshold for surface melt fracture.

Film

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%, tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

The Ethylene Polymers

The polymers which may be used in the process of the present invention are homopolymers of ethylene or copolymers of a major mol percent (greater than or equal to 80%) of ethylene, and a minor mol percent (less than or equal to 20%) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1 and octene-1.

The ethylene polymers have a melt flow ratio of about greater than or equal to 18 to less than or equal to 50, and preferably of about greater than or equal to 22 to less than or equal to 30.

The homopolymers have a density of about greater than or equal to 0.958 to less than or equal to 0.972 and preferably of about greater than or equal to 0.961 to less than or equal to 0.968. The copolymers have a density of about greater than or equal to 0.89 to less than or equal to 0.96 and preferably greater than or equal to 0.917 to less than or equal to 0.955, and most preferably, of about greater than or equal to 0.917 to less than or equal to 0.935. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about greater than or equal to 0.96. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

When made in the fluid bed process, polymers of the present invention are granular materials which have a settled bulk density of about 15 to 32 pounds per cubic foot and an average particle size of the order of about 0.005 to about 0.06 inches.

For the purposes of making film in the process of the present invention, the preferred polymers are the copolymers and particularly those copolymers having a density of about greater than or equal to 0.917 to less than or equal to 0.924; and a standard melt index to greater than or equal to 0.1 to less than or equal to 5.0.

The films made in the process of the present invention have a thickness of greater than 0.1 mil to less than or equal to 10 mils and preferably of greater than 0.1 mil to less than or equal to 5 mils.

Having set forth the general nature of the invention, the following examples illustrate some specific embodiments of the invention. It is to be understood, however, that this invention is not limited to the examples, since the invention may be practiced by the use of various modifications.

EXAMPLE 1

This Example demonstrates a conventional procedure for extruding ethylene polymers into tubes.

An ethylene-butene copolymer was prepared in accordance with the procedure of U.S. Pat. No. 4,302,566 and which is available from Union Carbide Corporation under the Trademark designation Bakelite GRSN 7047. The copolymer was dry blended with 4% of a conventional masterbatch containing conventional antiblock agent, slip agent and antioxidants and also included 320 ppm by weight of Kemamine AS 990. The copolymer had a nominal density of 0.918 gm/cc, a nominal melt index of 1.0 decigrams/min., and a nominal melt flow ratio of 26. The copolymer was formed into a tube by passing the resin through a conventional 2½ inch diameter screw extruder having a polyethylene screw as described in U.S. Pat. No. 4,329,313 with a Maddock mixing section, and thence into a conventional chrome plated die having a 0.5 inch land, 3 inch die collar diameter and a die pin diameter normally of 2.92 inches to give a 40 mil. die gap. The sides of the die land were parallel with the flow axis of the polymer melt. The resin was extruded through the die at a rate of 66 lbs/hr at a temperature of 221° C. There was severe surface melt fracture observed on both surfaces of the tube.

EXAMPLE 2

This Example demonstrates the improved results obtained over Example 1 by the use of free cutting Brass die pin and collar nominally containing 35% Zinc, 61.5% Copper, 3% Lead and 0.5% Iron. This surface provides improved adhesion over the conventional chrome plated steel surface of Example 1.

The ethylene-butene copolymer was identical to Example 1 and contained the masterbatch. The copolymer was formed into a tube by passing the resin through the conventional 2½ inch diameter extruder and mixer of Example 1 and into the die of Example 1 except for the brass surface of the die land. The resin was extruded through the die at a rate of 66 lbs/hr and at a temperature of 220° C. Other than during the initial start-up (induction period) there was no surface melt fracture on either surface of the tube.

What is claimed is:

1. A process for substantially eliminating surface melt fracture during extrusion of an ethylene polymer under adhesion conditions between the material constituting a conventional die land surface and the polymer, which would otherwise produce higher levels of melt fracture which comprises extruding said polymer through a die having a die land surface fabricated from a material other than a conventional die land material which increases adhesion between the die land surface and the polymer to an extent sufficient to substantially eliminate surface melt fracture.

2. A process according to claim 1 wherein said material is a metal, or a metal alloy.

3. A process according to claim 2 herein said metal material is contained in inserts secured to the pin and collar of said die.

4. A process according to claim 2 wherein said metal material constitutes the material of construction of the die pin of the die collar of said die.

5. A process according to claim 1 wherein said copolymer is a copolymer of greater than or equal to 80 mol percent of ethylene and less than or equal to 20 mol percent of at least one $C_3$ to $C_8$ alpha olefin.

6. A process according to claim 5 in which said copolymer has a melt index of greater than or equal to 0.1 to less than or equal to 5.0.

* * * * *